United States Patent
David et al.

(10) Patent No.: US 9,781,677 B2
(45) Date of Patent: Oct. 3, 2017

(54) SAVING POWER ON HANDSETS BY FILTERING RECEIVED STATUS UPDATES

(71) Applicant: Nokia Corporation, Espoo (FI)

(72) Inventors: Ram Adva Fish David, Menlo Park, CA (US); Dilip Raghu Kenchammana-Hosekote, Menlo Park, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 15/194,092

(22) Filed: Jun. 27, 2016

(65) Prior Publication Data

US 2016/0309415 A1 Oct. 20, 2016

Related U.S. Application Data

(63) Continuation of application No. 11/820,333, filed on Jun. 18, 2007, now abandoned.

(51) Int. Cl.
| | |
|---|---|
| H04M 3/42 | (2006.01) |
| H04W 52/02 | (2009.01) |
| H04L 12/58 | (2006.01) |
| H04W 4/12 | (2009.01) |

(52) U.S. Cl.
CPC ....... H04W 52/0251 (2013.01); H04L 51/046 (2013.01); H04W 4/12 (2013.01); H04M 3/42365 (2013.01); Y02B 60/50 (2013.01)

(58) Field of Classification Search
CPC ..... H04L 12/581; H04L 51/04; H04L 12/189; H04L 67/24; H04L 67/04; H04L 67/28; H04L 67/2838; H04L 67/2857; H04L 67/2861; H04L 67/145; H04L 65/1016; H04L 67/34; H04L 43/0805; H04L 49/20; H04L 61/2069; H04L 67/104; H04L 61/2038; H04L 61/6059; H04L 67/306; H04L 43/10; H04L 51/043; H04L 12/5895; H04W 4/06; H04W 56/00; H04W 88/02
USPC ..... 455/574, 229; 370/311, 318, 230, 395.2; 713/320, 311, 323; 707/621, 622
See application file for complete search history.

(56) References Cited

U.S. PATENT DOCUMENTS

| | | | |
|---|---|---|---|
| 6,868,544 | B2 | 3/2005 | Dalal et al. |
| 6,883,016 | B1 | 4/2005 | Fujii et al. |
| 6,909,910 | B2 | 6/2005 | Pappalardo et al. |
| 7,187,935 | B1 | 3/2007 | Day |
| 7,317,907 | B2 | 1/2008 | Linkert et al. |
| 7,440,746 | B1 | 10/2008 | Swan |
| 7,496,379 | B2 | 2/2009 | Kaplan et al. |
| 7,499,537 | B2 | 3/2009 | Elsey et al. |
| 7,688,953 | B2 | 3/2010 | Chatterjee et al. |
| 7,693,832 | B2 | 4/2010 | Vargas et al. |
| 2004/0058710 | A1 | 3/2004 | Timmins et al. |

(Continued)

OTHER PUBLICATIONS

US Office Action for related U.S. Appl. No. 11/820,409 dated Nov. 3, 2011, pp. 1-18.

(Continued)

*Primary Examiner* — Nimesh Patel
(74) *Attorney, Agent, or Firm* — Ditthavong & Steiner, P.C.

(57) ABSTRACT

In one embodiment, a method for saving power on a mobile device includes receiving an indication of termination of a power-save mode of the mobile device, and requesting presence information for a plurality of peers of a user from a server or a P2P communication network in response to the received indication.

20 Claims, 7 Drawing Sheets

(56) References Cited

U.S. PATENT DOCUMENTS

| | | | |
|---|---|---|---|
| 2004/0071150 A1 | 4/2004 | Honkala et al. |
| 2004/0162882 A1 | 8/2004 | Mora |
| 2004/0214609 A1 | 10/2004 | Sagi et al. |
| 2005/0009537 A1 | 1/2005 | Crocker et al. |
| 2005/0021854 A1 | 1/2005 | Bjorkner |
| 2005/0032527 A1 | 2/2005 | Sheha et al. |
| 2005/0129042 A1 | 6/2005 | Muhonen et al. |
| 2005/0198545 A1 | 9/2005 | Wieck et al. |
| 2006/0084478 A1 | 4/2006 | Erlichmen |
| 2006/0085483 A1 | 4/2006 | Mooney et al. |
| 2006/0172724 A1 | 8/2006 | Linkert et al. |
| 2007/0143357 A1 | 6/2007 | Chaudhri |
| 2008/0201419 A1 | 8/2008 | Hung et al. |

OTHER PUBLICATIONS

US Office action of related U.S. Appl. No. 11/820,409 dated May 26, 2011, pp. 1-19.

US Office action of related U.S. Appl. No. 11/820,409 dated Dec. 28, 2010, pp. 1-17.

US Office action of related U.S. Appl. No. 11/820,409 dated May 18, 2010, pp. 1-15.

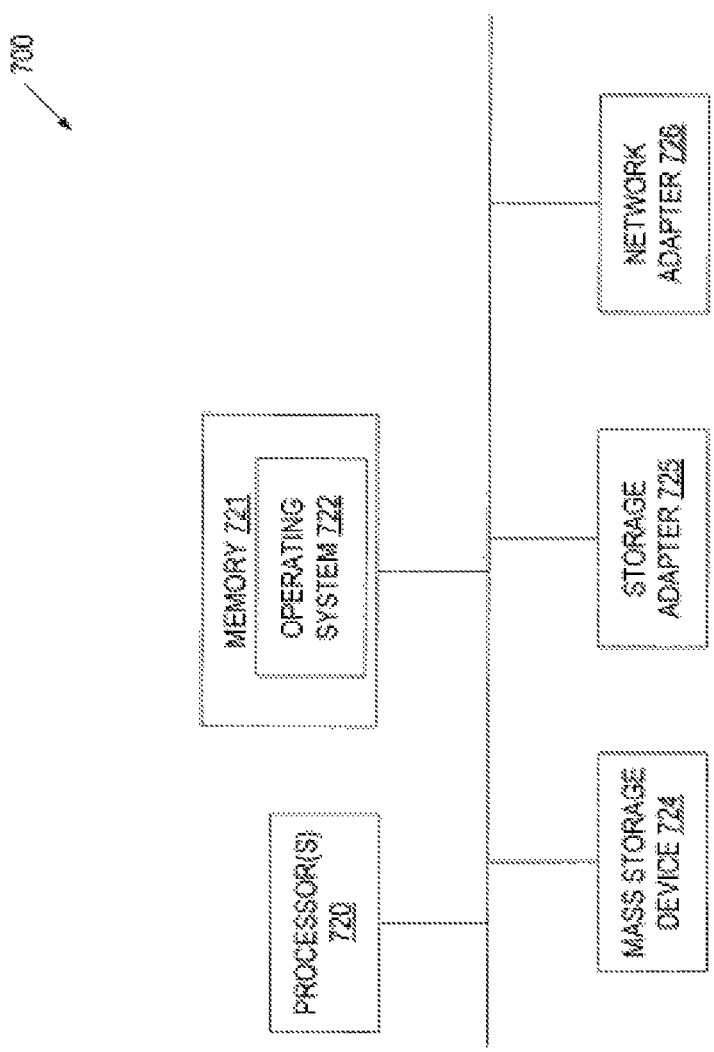

SAVING POWER ON HANDSETS BY FILTERING RECEIVED STATUS UPDATES

This application is a continuation of U.S. patent application Ser. No. 11/820,333, filed Jun. 18, 2007, entitled "SAVING POWER ON HANDSETS BY FILTERING RECEIVED STATUS UPDATES", which is incorporated herein by reference in its entirety.

FIELD OF THE INVENTION

Embodiments of the present invention relate generally to instant messaging communications between mobile devices, and more particularly to saving power on mobile devices by filtering received status updates.

BACKGROUND OF THE INVENTION

Instant Messaging (IM) is a form of real-time communication between two or more people based on typed text, recorded or real-time voice with or without video. The messages are conveyed via computers connected over a network such as the Internet. IM systems typically include a presence server that collects and distributes presence information. In some cases, IM systems also collect and distribute presence information via a distributed peer-to-peer ("P2P") communication network in addition to, or instead of, a presence server. Presence information may indicate where a person is located, whether he currently accepts messages from others, etc. Presence information may change frequently and is typically of interest to a large number of users. As a result, the presence service is constantly distributing presence updates to a large number of clients, and each client frequently receives and processes presence updates of other clients.

In a wired network, PCs run on outlet power and are always on. Hence, the cost of receiving and processing presence updates is low in terms of power consumption. However, in a wireless network, mobile devices have limited power resources, and the cost associated with frequent presence updates is high because mobile devices have to come out of power-save mode in order to receive and process incoming presence updates.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7 is a block diagram of an exemplary server that may be used to perform one or more of the operations described herein.

DETAILED DESCRIPTION OF THE INVENTION

Figure 1:
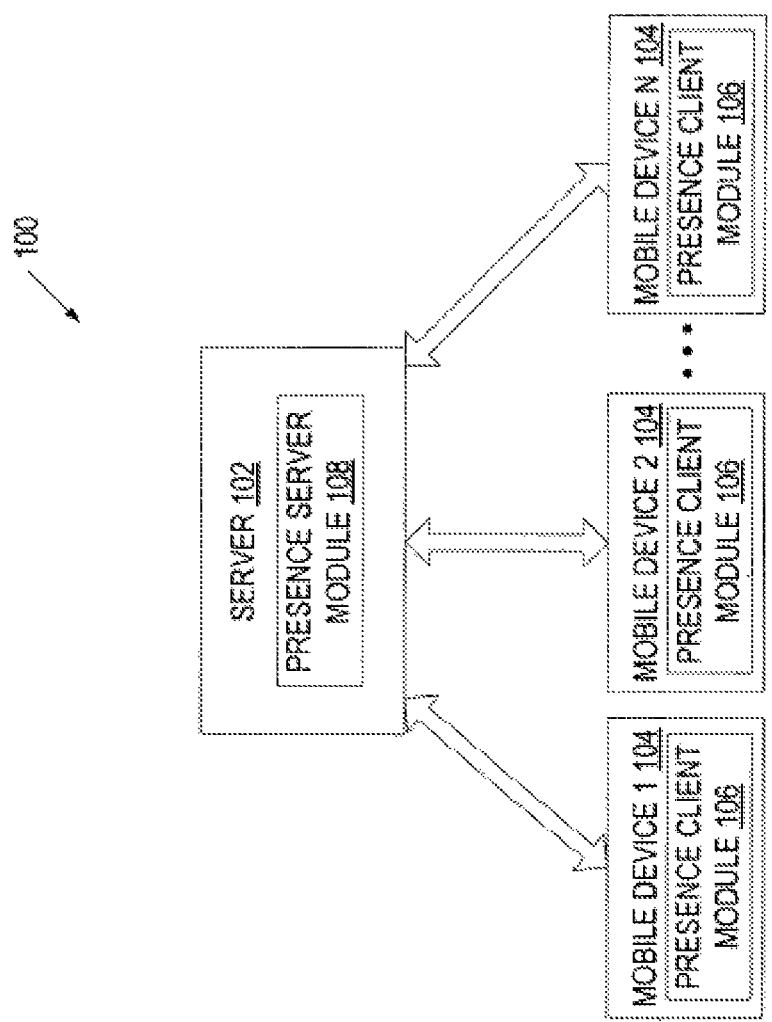
FIG. 1 illustrates an exemplary network architecture in which embodiments of the invention may operate.

Methods and systems for saving power on a mobile device by minimizing presence updates received by the mobile device are discussed. The methods and systems described herein apply to server-based IM systems as well as peer-to-peer ("P2P") IM systems, or to a hybrid IM system that employs a combination of server-based and P2P IM systems. In one embodiment, a mobile device does not automatically receive constant presence updates from a server but rather sends explicit requests for presence updates to the server.

While in a power-save mode, the mobile device does not request presence updates from the server until the mobile device comes out of power-save mode. The likely causes for the device to come out of power-save mode include, but are not limited to, completion of a pre-set or computed time interval as measured by the device, or an indication of user intent to terminate the power-save mode. Upon determining that the power-save mode is ending, the mobile device requests presence updates for the user's peers, either from the server, or from the peer-to-peer communication network. In one embodiment, the mobile device requests presence updates for each contact in the contacts list. Alternatively, the mobile device selects a subset of contacts from the list and then requests presence updates for each contact in the selected subset.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include mobile devices (clients) 104 and a server 102. The mobile devices 106 may be, for example, mobile phones, palm-sized computing devices, personal digital assistants (PDAs), smartphones, etc. Each mobile device 104 runs an IM application that supports exchange of messages with other mobile devices 104.

The mobile devices 104 can operate in a Global system for Mobile communications (GSM) network including a number of base stations, a code division multiple access (CDMA) network or any other cellular mobile communication system. Alternatively, the mobile devices 104 can operate in a wireless local area network (WLAN) such as a Wi-Fi network having access points that can connect the mobile devices 104. In some embodiments, the mobile devices 104 are dual-mode mobile devices that can connect to both the WLAN and the cellular mobile communication system such as the GSM or CDMA network.

The server 102 is connected to the cellular mobile communication system and/or the WLAN via a wired network. The server 102 facilitates IM communication between the mobile devices 104 by receiving updates regarding the presence status of each participating mobile device 104. In one embodiment, the server 102 hosts a presence server module 108 that collects presence updates from the mobile devices 104 and sends relevant presence updates to the mobile devices 104. In one embodiment, the presence server module 108 does not constantly distribute presence updates to the mobile devices 104 but rather waits for a request from a mobile device 104 and only then sends requested presence updates to the mobile device 104.

In one embodiment, each mobile device 104 hosts a presence client module 106 that may be part of an IM application or an independent application. The presence client module 106 facilitates saving of power on the mobile device 104. In particular, the presence client module 106 does not register with the server 102 for constant presence updates concerning other mobile devices but rather pulls presence updates only when the mobile device 104 is in the active mode or is about to come out of the power save mode. As a result, the mobile device 104 does not have to frequently come out' of the power save mode to receive incoming presence updates and process them.

In one embodiment, the presence client module 105 sends its own presence updates only when the mobile device 104 is in the active mode or is about to come out of the power save mode. Alternatively, the mobile device 104 is coupled to a local server (not shown) via a local network (e.g., LAN) that acts as a proxy on behalf of the mobile device 104 and sends keep-alive messages to the server 102, allowing the mobile device 104 to go into the power save mode for extended periods.

In other embodiments (not shown), presence information is collected and disseminated via a distributed peer-to-peer ("P2P") communication network in addition to, or instead of, the server 102. In the P2P network scenario, power saving is especially important due of a large number of presence updates flowing between IM clients.

Figure 2:
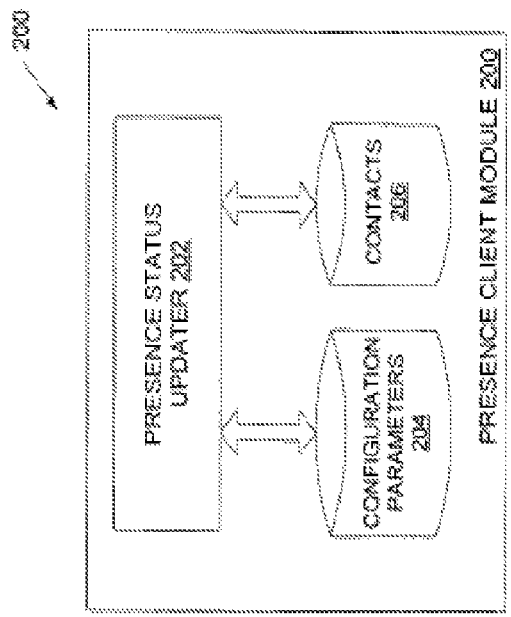
FIG. 2 is a block diagram of one embodiment of a presence client module.

FIG. 2 is a block diagram of one embodiment of a presence client module 200. The presence client module 200 may include a presence status updater 202, a configuration parameters data store 204, and a contacts data store 206. The data stores 204 and 206 may be in the form of a table, a file or any other data structure.

The presence status updater 202 detects that the mobile device is about to come out of the power save mode and issues a request to a server or a P2P communication network for presence information concerning peers of the user. The presence status updater 202 may detect that the mobile device is about to come out of the power save mode upon determining that a pre-set or computed time interval is completed, or upon receiving an indication of the user intent to terminate the power save mode. Such user intent may be demonstrated when the user starts interacting with the mobile device (e.g., by pressing a key or a button, activating the contacts screen, or merely touching an outside surface of the mobile device). The configuration parameters 204 may specify which user actions are indicative of the user intent to terminate the power save mode. These parameters may be entered by the user or be hardcoded.

When the presence status updater 202 issues a request for presence updates to the server or the P2P communication network, this request may ask for presence updates of each contact in the contacts list 206. The contacts list 206 may be maintained by the IM application, the presence client module 200 or any other application, and may be entered by the user or generated automatically based on user communication history. Alternatively, the presence status updater 202 may request presence updates for a subset of contacts selected from the list 206. The selected subset may include a predefined number of most frequently used contacts, a predefined number of most recently used contacts, etc. The configuration parameters 204 may specify the criteria to select contacts for which status updates should be requested (e.g., each contact on the list, 20 contacts most frequently used, 10 contacts most recently used, etc.).

When the mobile device comes out of the power save mode, the presence status updater 202 may send requests for presence updates each time the user activates the contacts screen, each time the user indicates that the presence state of contacts is needed, every 10 minutes, or whichever happens sooner. The configuration parameters 204 may specify the frequency requirements for obtaining presence updates.

In one embodiment, the presence status updater 202 sends presence updates of the mobile device to the server or the P2P communication network only when the mobile device is in the active mode or is about to come out of the power save mode. The presence status updater 202 may send presence updates periodically or based on other criteria specified by the configuration parameters 204. Alternatively, the presence status updater 202 does not send the presence updates to the server or the P2P communication network. Rather, the mobile device may be coupled to a server that acts as a proxy on behalf of the mobile device and sends keep-alive messages to the server or the P2P communication network. The proxy-server may reside on a private network (e.g., the local area network (LAN)) or a public network (e.g., the Internet). A proxy located on the public network such as the Internet may be especially useful for collecting and throttling presence updates in a P2P IM system.

Figure 3:
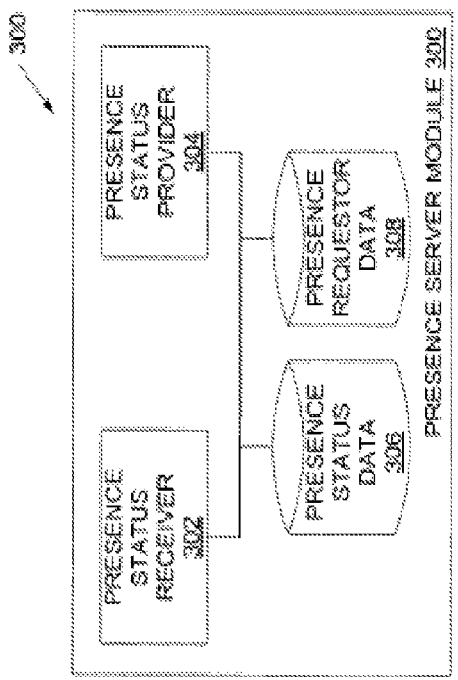
FIG. 3 is a block diagram of one embodiment of a presence server module.

FIG. 3 is a block diagram of one embodiment of a presence server module 300. The presence server module 300 includes a presence status receiver 302, a presence status provider 304, a presence status data store 306, and a presence requestor information data store 308. The data stores 304 and 306 may be in the form of a table, a file or any other data structure.

The presence status receiver 302 creates presence requestor data 308. The presence requestor data 308 identifies mobile devices registered with the server to receive presence updates. In one embodiment, the presence requestor data 308 includes list 1 specifying mobile devices that should receive constant presence updates and list 2 specifying mobile devices that should receive presence updates on demand (only when requested).

The presence status receiver 302 receives presence updates from multiple mobile devices and stores them in the data store 306. In one embodiment, the presence status receiver 302 receives presence updates from proxies of mobile devices rather than from mobile devices directly.

The presence status provider 304 sends relevant presence updates to the mobile devices. In one embodiment, the presence status provider 304 sends constant presence updates to mobile devices from list 1 but not to mobile devices from list 2. As to list 2, the presence status provider 304 waits for a request from a mobile device from list 2, and only then sends presence updates to this mobile device. The request may identify specific contacts for which presence updates are requested. In one embodiment, a second request sent to the server by the same mobile device includes a new list of contacts only if the list of contacts included in the previous request has been modified:

In a P2P communication network, a module similar to the presence server module 300 may be employed to reduce the number of presence updates flowing between IM clients.

Figure 4:
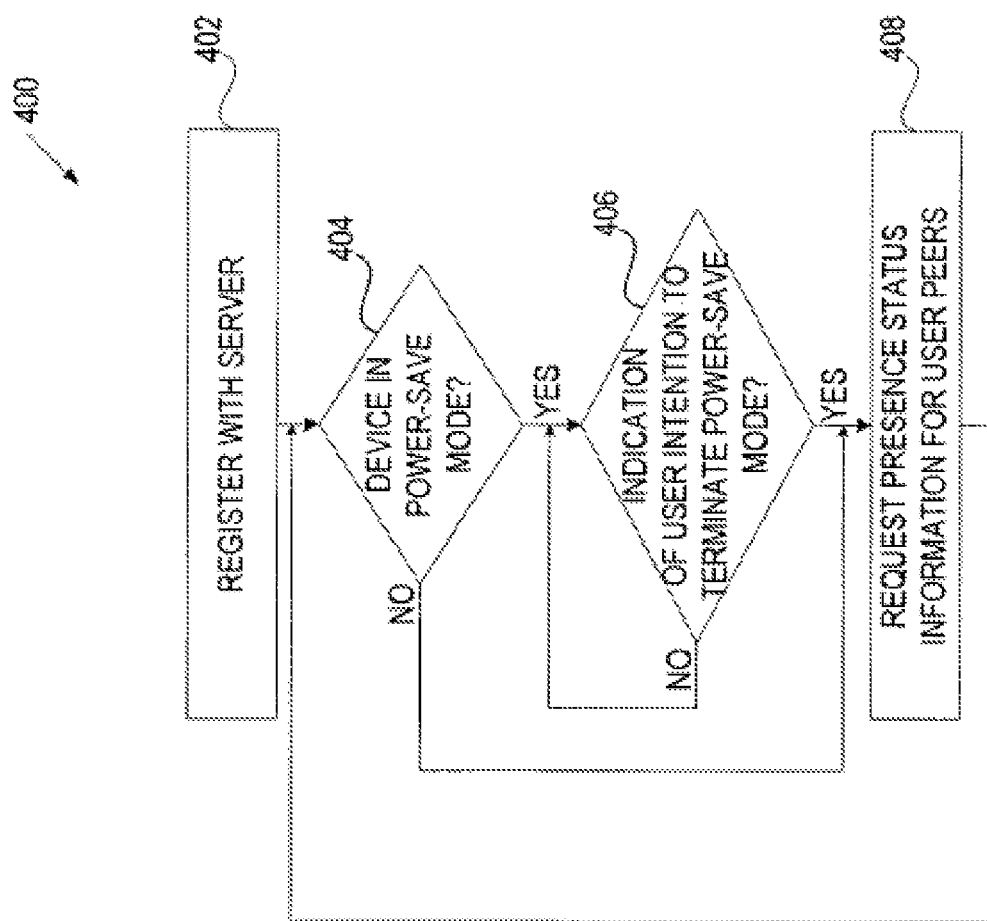
FIG. 4 is a flow diagram of one embodiment of a method for saving power on a mobile device by minimizing presence updates received by the mobile device.

FIG. 4 is a flow diagram of one embodiment of a method 400 for saving power on a mobile device by minimizing presence updates received by the mobile device. The method may be performed by processing logic that may comprise hardware (e.g., circuitry, dedicated logic, etc.), software (such as run on a general purpose computer system or a dedicated machine), or a combination of both. In one embodiment, processing logic resides in a presence client module (e.g., module 200 of FIG. 2).

Referring to FIG. 4, processing logic begins with registering with a server (e.g., a presence server) and/or a P2P communication network to receive presence updates upon request (block 402). Next, processing logic periodically checks the current mode of the mobile device. If the mobile device is in the power-save mode (block 404), processing logic waits for an indication that the power-save mode is ending. Such an indication may be received if, for example, a preset or computed time interval is expiring or is about to expire, an indication of user intent to terminate the power-save mode is received, etc. (block 406). Such an indication of the user intent may be demonstrated when the user starts interacting with the mobile device (e.g., by pressing a key or a button, activating the contacts screen, or merely touching an outside surface of the mobile device). Upon determining that the power-save mode is ending, processing logic requests presence information for the user's peers from the server or the P2P communication network (block 408). The presence information may be requested for each contact in the current contacts list (e.g., IM contacts list). Alternatively, processing logic may select a subset of contacts from the contacts list and request presence updates for each contact in the selected subset. The subset may be selected based on a predefined criterion (e.g., a predefined number of most frequently used contacts, a predefined number of most recently used contacts, etc.).

If processing logic determines that the mobile device is in the active mode and not the power-save mode (block 404), processing logic sends a request for presence updates to the server or the P2P communication network (block 408) if a predefined condition is satisfied (e.g., the user activates the contacts screen, the user indicates that the presence state of contacts is needed, a predefined time interval has expired, or whichever happens sooner).

In addition to requests for presence updates of other mobile devices, processing logic may also send status updates of this mobile device to the server or the P2P communication network. The status updates of the mobile device may be sent at the same time as the requests for presence updates of the other mobile devices or with a different frequency but only when the mobile device is in the active mode or is about to come out of the power save mode.

Figure 5A:
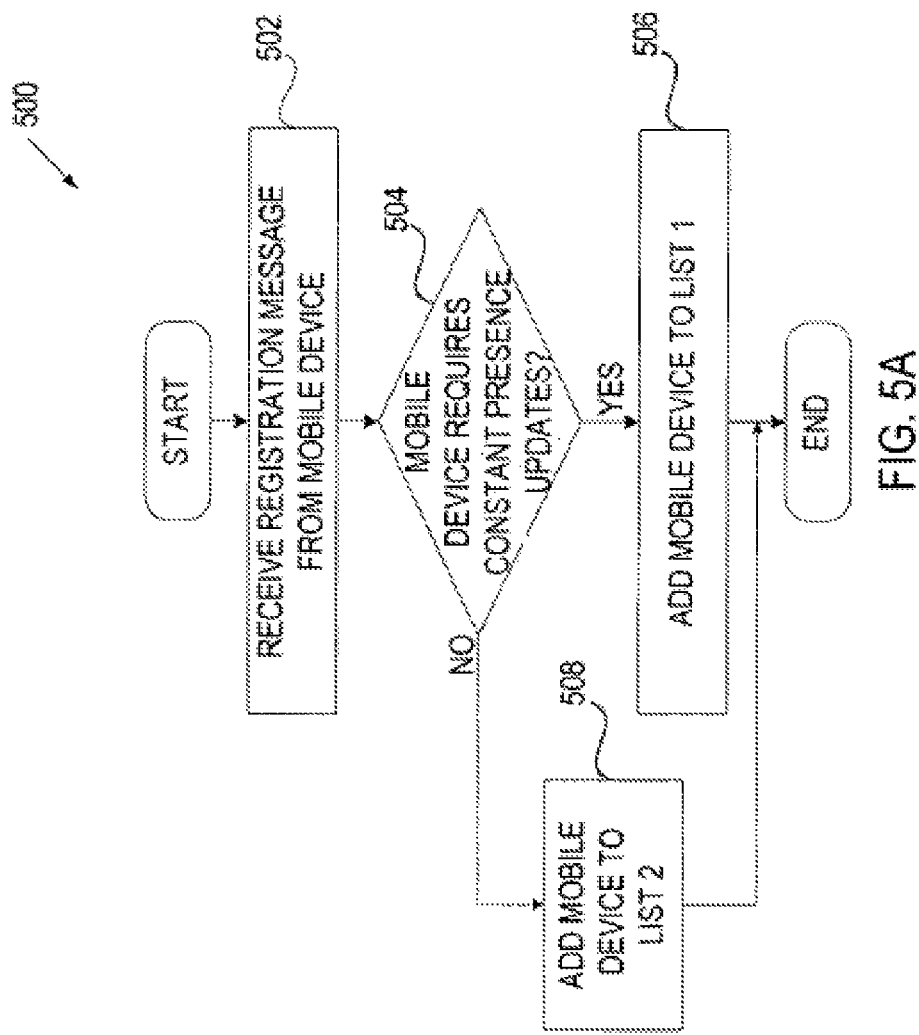
FIG. 5A is a flow diagram of one embodiment of a method for registering mobile devices with a presence server.

FIG. 5A is a flow diagram of one embodiment of a method 500 for registering mobile devices with a presence server. The method may be performed by processing logic that may comprise hardware (e.g., circuitry, dedicated logic, etc.), software (such as run on a general purpose computer system or a dedicated machine), or a combination of both. In one embodiment, processing logic resides in a presence server module (e.g., module 300 of FIG. 3).

Referring to FIG. 5A, processing logic begins with receiving a registration message from a mobile device (block 502). The registration message may specify that mobile device needs constant presence updates or that the mobile device only wants to receive presence updates on demand (e.g., using such protocols as XMPP, SIMPLE, etc.).

If the mobile device needs constant presence updates (block 504), processing logic adds the mobile device to list 1 (block 506). Otherwise, processing logic adds the mobile device to list 2 (block 508).

Figure 5B:
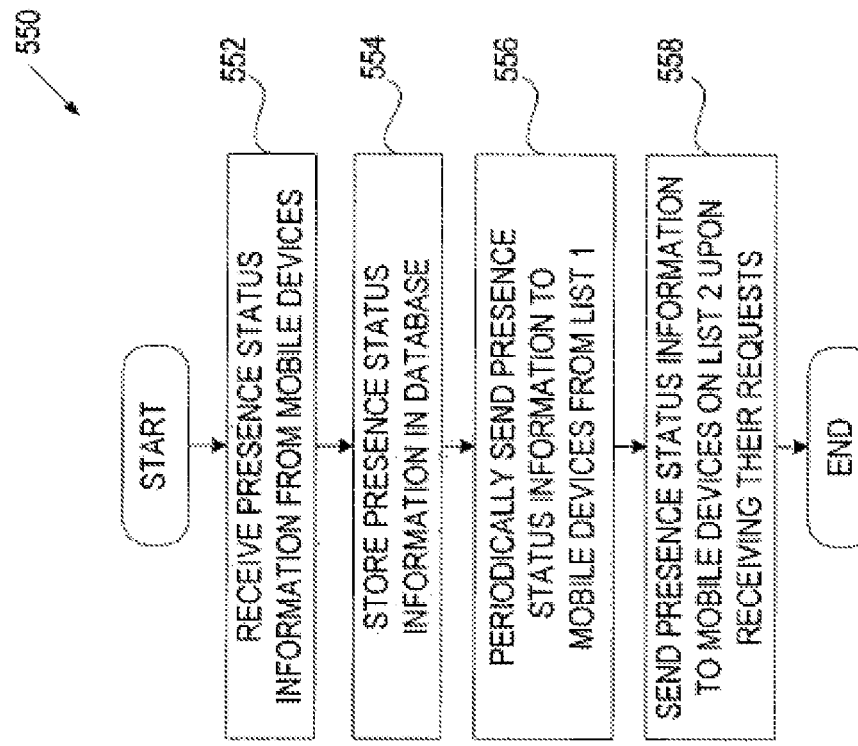
FIG. 5B is a flow diagram of one embodiment of a method for providing presence updates to mobile devices.

FIG. 5B is a flow diagram of one embodiment of a method 550 for providing presence updates to mobile devices. The method may be performed by processing logic that may comprise hardware (e.g., circuitry, dedicated logic, etc.), software (such as run on a general purpose computer system or a dedicated machine), or a combination of both. In one embodiment, processing logic resides in a presence server module (e.g., module 300 of FIG. 2).

Referring to FIG. 5B, processing logic begins with receiving presence information from mobile devices (block 552) and storing the presence information in a database (block 554). Processing logic may receive presence information directly from mobile devices or from proxies of mobile devices.

At block 556, processing logic accesses list 1 specifying mobile devices that should receive constant presence updates and sends corresponding presence updates to the mobile devices from list 1. Processing logic repeats block 556 at frequent time intervals, providing constant presence updates to the mobile devices from list 1.

At block 558, processing logic receives a request for presence updates from a mobile device on list 2 and sends relevant presence updates to the requesting mobile device. Processing logic repeats block 558 each time it receives a request from a mobile device on list 2.

In a P2P communication network, methods similar to methods 500 and 550 may be employed to reduce the number of presence updates flowing between IM clients.

Figure 6:
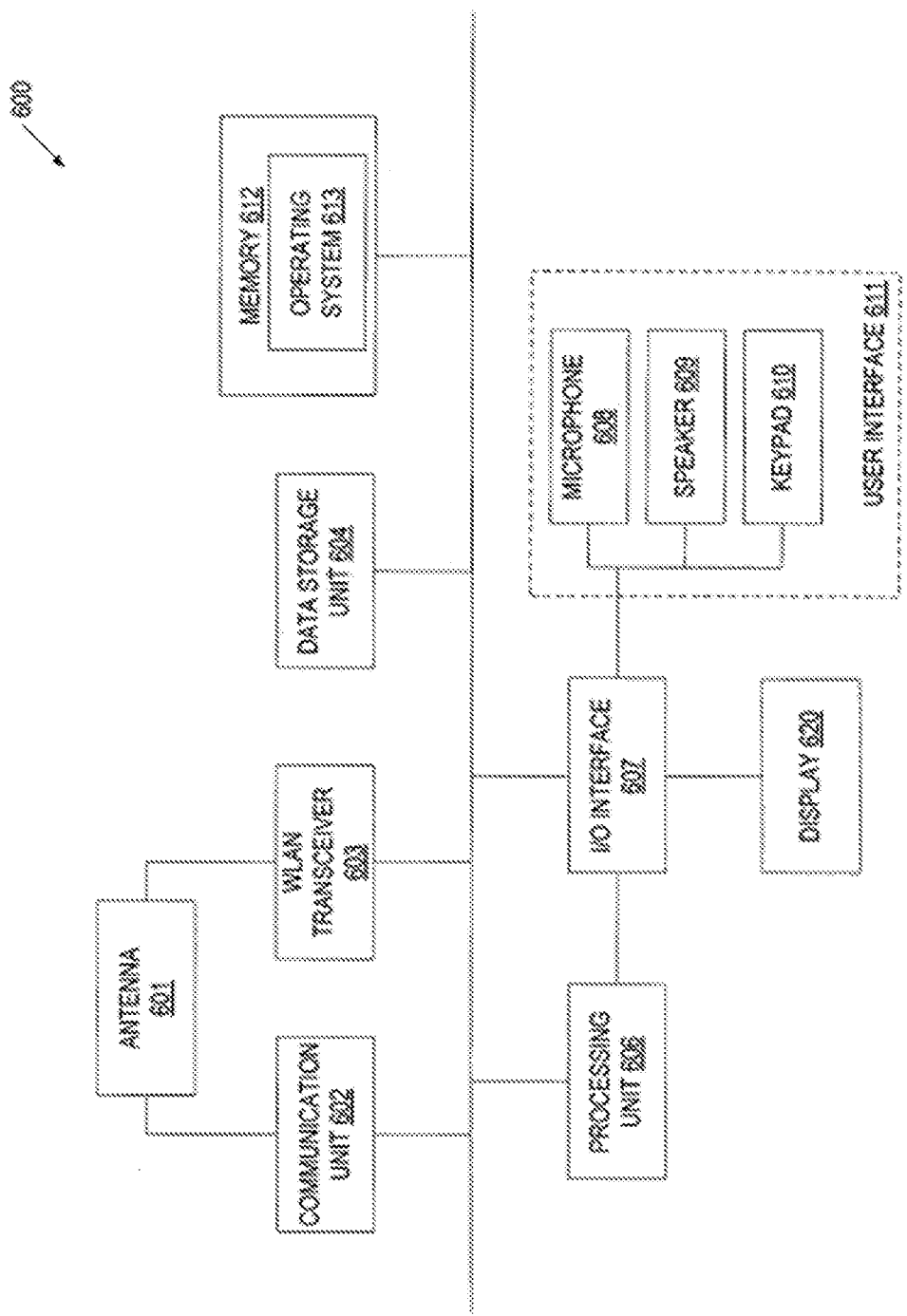
FIG. 6 is a block diagram of an exemplary mobile device that may be used to perform one or more of the operations described herein.

FIG. 6 is a high level block diagram of a mobile device (shown in FIG. 1). As shown, the mobile device 600 may be any device capable of receiving and transmitting data. The mobile device 600 contains a processing unit 606 that is communicatively coupled to the other components of the mobile device 600 via a bus.

The mobile device 600 also includes memory 612 coupled to the bus. The memory 612 represents any form of random access memory (RAM), read-only memory (ROM), flash memory, or a combination thereof. Memory 612 stores, among other things, the operating system 613 of the mobile device 600.

The mobile device 600 contains a data storage unit 604. The data storage unit 604 may be or include any conventional medium for storing data in a non-volatile manner. The processing unit 206 and the data storage unit 604 may communicate via the bus. Memory 612 and data storage unit 604 store software instructions and/or data, which may include instructions and/or data used to implement the techniques introduced here.

The mobile device 600 also includes I/O interface 607, which may reside on the same microprocessing chip as the processing unit 606. However, I/O interface 607 may also reside on an external unit. I/O interface 607 connects the processing unit 606 to a display 620 and a user interface 611. In one embodiment, the user interface 611 comprises keypad, input 610, microphone input 608, and speaker output 609. The I/O interface 607 may include an analog-to-digital converter for converting an analog microphone signal to a digital signal for use by the processing unit 606. The I/O interface 607 may also include a digital-to-analog converter to convert digital information from the processing unit 606 to the speaker 609, such as voice data.

The processing unit 606 transmits and receives digital signals which are to be communicated outside the mobile device 600 via the communication unit 602. The communication unit 602 is connected to an antenna 601, which communicates signals through airwaves to the cellular mobile communication system (e.g., to the GSM network via a GSM base station). The mobile device 600 also includes a wireless local area network (WLAN) transceiver 603 to communicate wirelessly with a WLAN (such as a Wi-Fi network) via the antenna 601. The WLAN transceiver 603 is coupled with the processing unit 606 via the system bus.

FIG. 7 is a high level block diagram of a server (shown in FIG. 1). Certain standard and well-known components which are not germane to the present invention are not shown. The server 700 includes one or more processors 720 coupled to a bus system.

The bus system in FIG. 7 is an abstraction that represents any one or more separate physical buses and/or point-to-point connections, connected by appropriate bridges, adapters and/or controllers. The bus system, therefore, may include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The processors 720 are the central processing units (CPUs) of the server 700 and, thus, control the overall operation of the server 700. In certain embodiments, the processors 720 accomplish this by executing software stored in memory 721. A processor 720 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The server 600 also includes memory 721 coupled to the bus system. The memory 721 represents any form of random access memory (RAM), read-only memory (ROM), flash memory, or a combination thereof. Memory 721 stores, among other things, the operating system 722 of the server 700.

Also connected to the processors 720 through the bus system are a mass storage device 724, a storage adapter 725, and a network adapter 726. Mass storage device 724 may be or include any conventional medium for storing large quantities of data in a non-volatile manner, such as one or more disks. The storage adapter 725 allows the server 700 to access the data stores shown in FIG. 3. The network adapter 726 provides the server 700 with the ability to communicate with remote devices and may be, for example, an Ethernet adapter or a Fibre Channel adapter.

Memory 721 and mass storage device 724 store software instructions and/or data, which may include instructions and/or data used to implement the techniques introduced here. The system may include other components (e.g., input devices, such as a mouse and keyboard, and output devices such as a display).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
receiving presence information from a plurality of devices, wherein the plurality of devices includes at least one identified device not registered for constant presence updates, wherein the at least one identified device receives presence update when it is in an active mode;

storing of the presence information in a database;

selecting a subset of users for the at least one identified device based, at least in part, on predefined criterion;

receiving a request from the at least one identified device for the presence updates upon termination of a power-save mode;

transmitting the presence information for the subset of users to the at least one identified devices while the at least one identified device is in an active mode; and presenting the presence information for the subset of users to a user of the at least one identified device.

2. The method of claim 1, wherein the plurality of devices is coupled to respective local servers acting as respective proxies on behalf of the plurality of devices, and wherein the respective local servers send presence status information for display to (a) at least one identified device, and (b) at least one identified device that has requested presence updates.

3. The method of claim 1, wherein the predefined criterion comprises at least one of frequently used contacts or recently used contacts.

4. The method of claim 1, further comprising:
receiving the request for the presence information by a server or a peer-to-peer ("P2P") communication network.

5. The method of claim 1, further comprising:
refraining from requesting the presence information from the server or the P2P communication network while the at least one identified device is in a power-save mode until receiving an indication of termination of the power-save mode.

6. The method of claim 1, wherein the termination of a power-save mode comprises:
user intent to terminate the power-save mode by interacting with a portion of the at least one identified device or/and a pre-set or computed time interval.

7. The method of claim 6, wherein the portion of the at least one identified device is any one of a screen, a key, a button or an outside surface.

8. The method of claim 1, further comprising:
receiving the presence information from the plurality of devices by the server or the P2P communication network.

9. An apparatus comprising:
at least one processor; and
at least one memory including computer program code for one or more programs,
the at least one memory and the computer program code configured to, with the at least one processor, cause the apparatus to perform at least the following,
receive presence information from a plurality of devices, wherein the plurality of devices includes at least one identified device not registered for constant presence updates, wherein the at least one identified device receives presence update when it is in an active mode;
store the presence information in a database;
select a subset of users for the at least one identified device based, at least in part, on predefined criterion;
receive a request from the at least one identified device for the presence updates upon termination of a power-save mode;
transmit the presence information for the subset of users to the at least one identified device while the at least one identified device is in an active mode; and
present the presence information for the subset of users to user of the at least one identified device.

10. The apparatus of claim 9, wherein the plurality of devices is coupled to respective local servers acting as respective proxies on behalf of the plurality of devices, and wherein the respective local servers send presence status information for display to (a) at least one identified device, and (b) at least one identified device that has requested presence updates.

11. The apparatus of claim 9, wherein the predefined criterion comprises at least one of frequently used contacts or recently used contacts.

12. The apparatus of claim 9, further comprising:
receive the request for the presence information by a server or a peer-to-peer ("P2P") communication network.

13. The apparatus of claim 9, wherein the termination of a power-save mode comprises:
user intent to terminate the power-save mode by interacting with a portion of the at least one identified device or/and a pre-set or computed time interval.

14. The apparatus of claim 13, wherein the portion of the at least one identified device is any one of a screen, a key, a button or an outside surface.

15. The apparatus of claim 9, wherein the predefined criterion comprises at least one of frequently used contacts or recently used contacts.

16. A non-transitory computer-readable storage medium carrying one or more sequences of one or more instructions which, when executed by one or more processors, cause an apparatus to at least perform further steps:
receiving presence information from a plurality of devices, wherein the plurality of devices includes at least one identified device not registered for constant presence updates, wherein the at least one identified device receives presence update when it is in an active mode;
storing of the presence information in a database;
selecting a subset of users for the at least one identified device based, at least in part, on predefined criterion;
receiving a request from the at least one identified device for the presence updates upon termination of a power-save mode;
transmitting the presence information for the subset of users to the at least one identified devices while the at least one identified device is in an active mode; and
presenting the presence information for the subset of users to a user of the at least one identified device.

17. The non-transitory computer-readable storage medium of claim 16, wherein the plurality of devices is coupled to respective local servers acting as respective proxies on behalf of the plurality of devices, and wherein the respective local servers send presence status information for display to (a) at least one identified device, and (b) at least one identified device that has requested presence updates.

18. The non-transitory computer-readable storage medium of claim 16, wherein the termination of a power-save mode comprises:
user intent to terminate the power-save mode by interacting with a portion of the at least one identified device or/and a pre-set or computed time interval.

19. The non-transitory computer-readable storage medium of claim 18, wherein the portion of the at least one identified device is any one of a screen, a key, a button or an outside surface.

20. The non-transitory computer-readable storage medium of claim 16, wherein the predefined criterion comprises at least one of frequently used contacts or recently used contacts.

\* \* \* \* \*